United States Patent
Mercs

(10) Patent No.: US 8,443,288 B2
(45) Date of Patent: May 14, 2013

(54) UBIQUITOUS COMPANION AGENT

(75) Inventor: James S. Mercs, Huntington Beach, CA (US)

(73) Assignees: Sony Pictures Entertainment Inc., Culver City, CA (US); Sony Corporation, Tokyo (JP)

( * ) Notice: Subject to any disclaimer, the term of this patent is extended or adjusted under 35 U.S.C. 154(b) by 2518 days.

(21) Appl. No.: 10/401,911

(22) Filed: Mar. 28, 2003

(65) Prior Publication Data

US 2004/0100492 A1 May 27, 2004

Related U.S. Application Data

(60) Provisional application No. 60/429,038, filed on Nov. 22, 2002, provisional application No. 60/435,182, filed on Dec. 19, 2002.

(51) Int. Cl.
*G06F 3/00* (2006.01)

(52) U.S. Cl.
USPC ........... 715/744; 715/733; 715/734; 715/735; 715/736; 715/737

(58) Field of Classification Search .......... 715/733–737, 715/741–743
See application file for complete search history.

(56) References Cited

U.S. PATENT DOCUMENTS

| | | | |
|---|---|---|---|
| 6,288,716 B1 * | 9/2001 | Humpleman et al. | 715/733 |
| 7,124,101 B1 * | 10/2006 | Mikurak | 705/35 |
| 7,130,616 B2 * | 10/2006 | Janik | 455/412.1 |
| 2003/0229779 A1 * | 12/2003 | Morais et al. | 713/153 |

* cited by examiner

*Primary Examiner* — Doon Chow
*Assistant Examiner* — Linh K Pham
(74) *Attorney, Agent, or Firm* — Procopio, Cory, Hargreaves & Savitch LLC

(57) ABSTRACT

Methods and apparatus for controlling and interacting with devices across a network using a ubiquitous companion. In one implementation, a ubiquitous companion includes: an agent interface for communicating with an agent residing on a host device accessible to the companion, and accessing host device data indicating one or more capabilities of the host device; a command interface for building one or more agent commands according to the host device data and a request selection received from a user through the host device; an output interface for providing feedback to the user through the host device in a format that is adapted according to the host device data; and a controller for controlling interaction among the agent interface, the command interface, and the output interface.

13 Claims, 11 Drawing Sheets

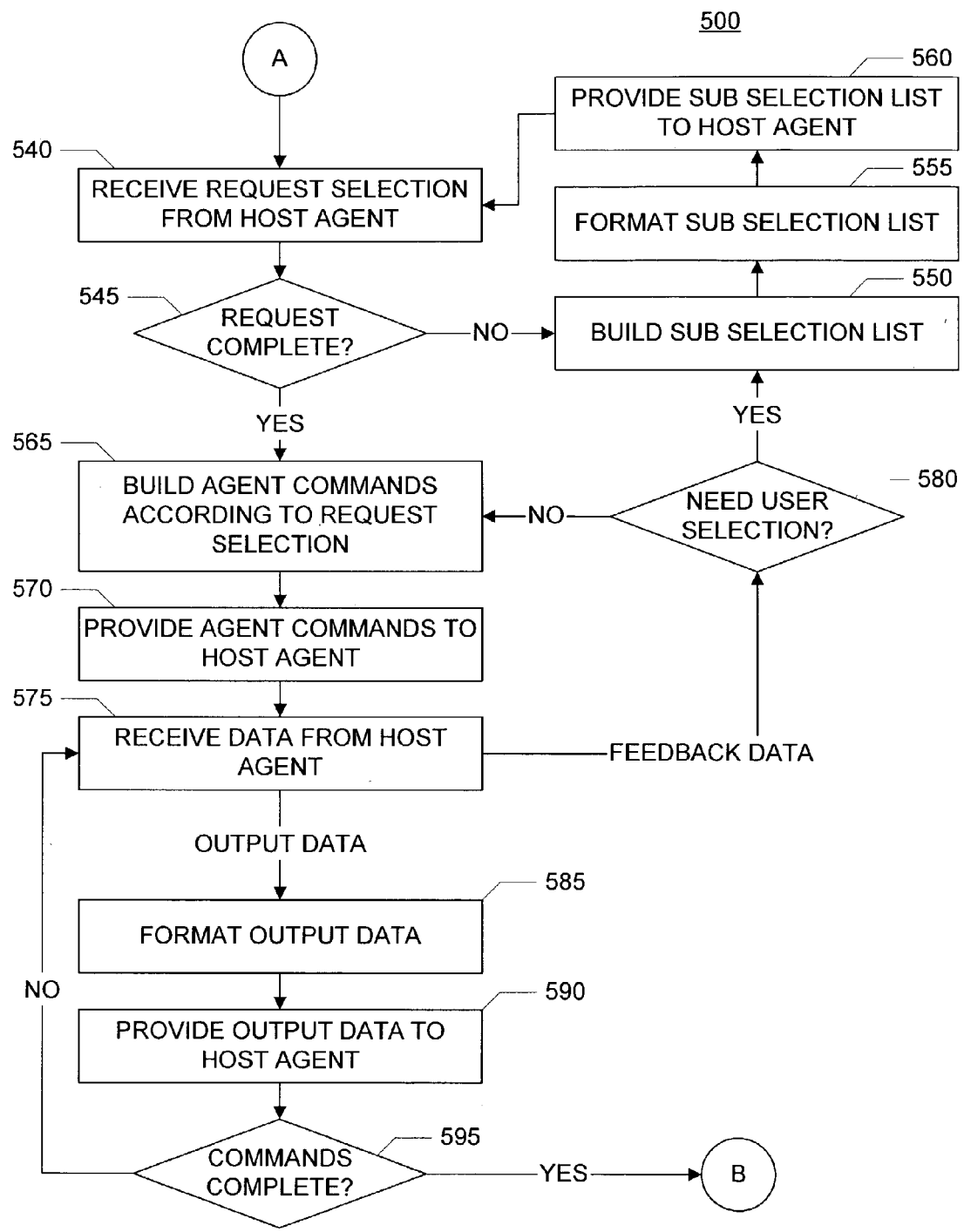

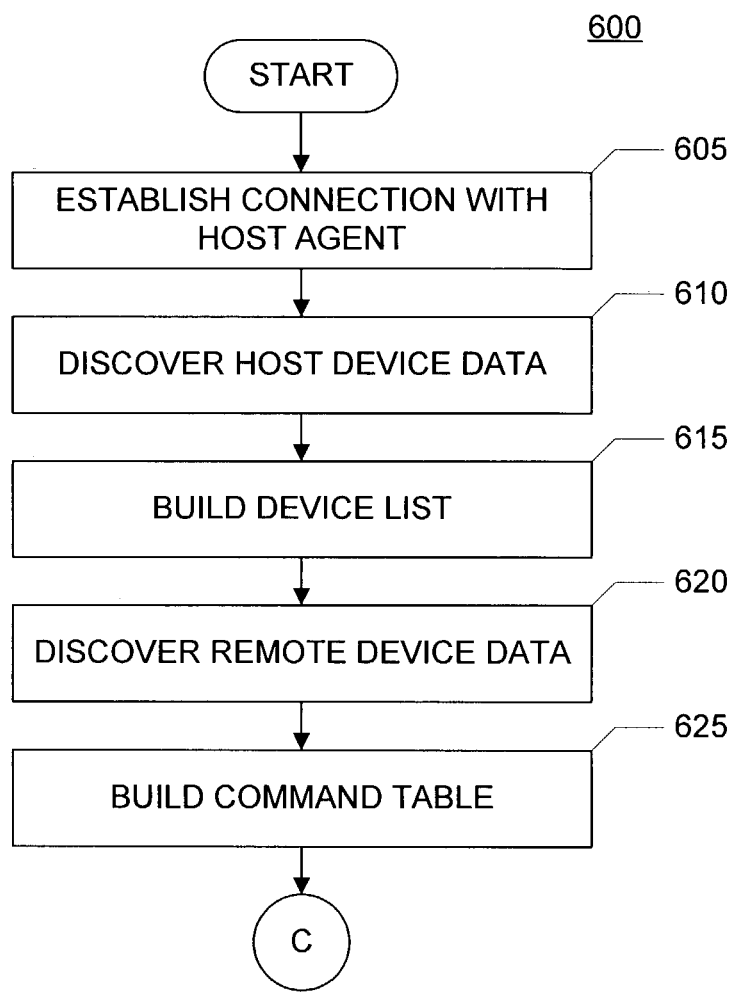

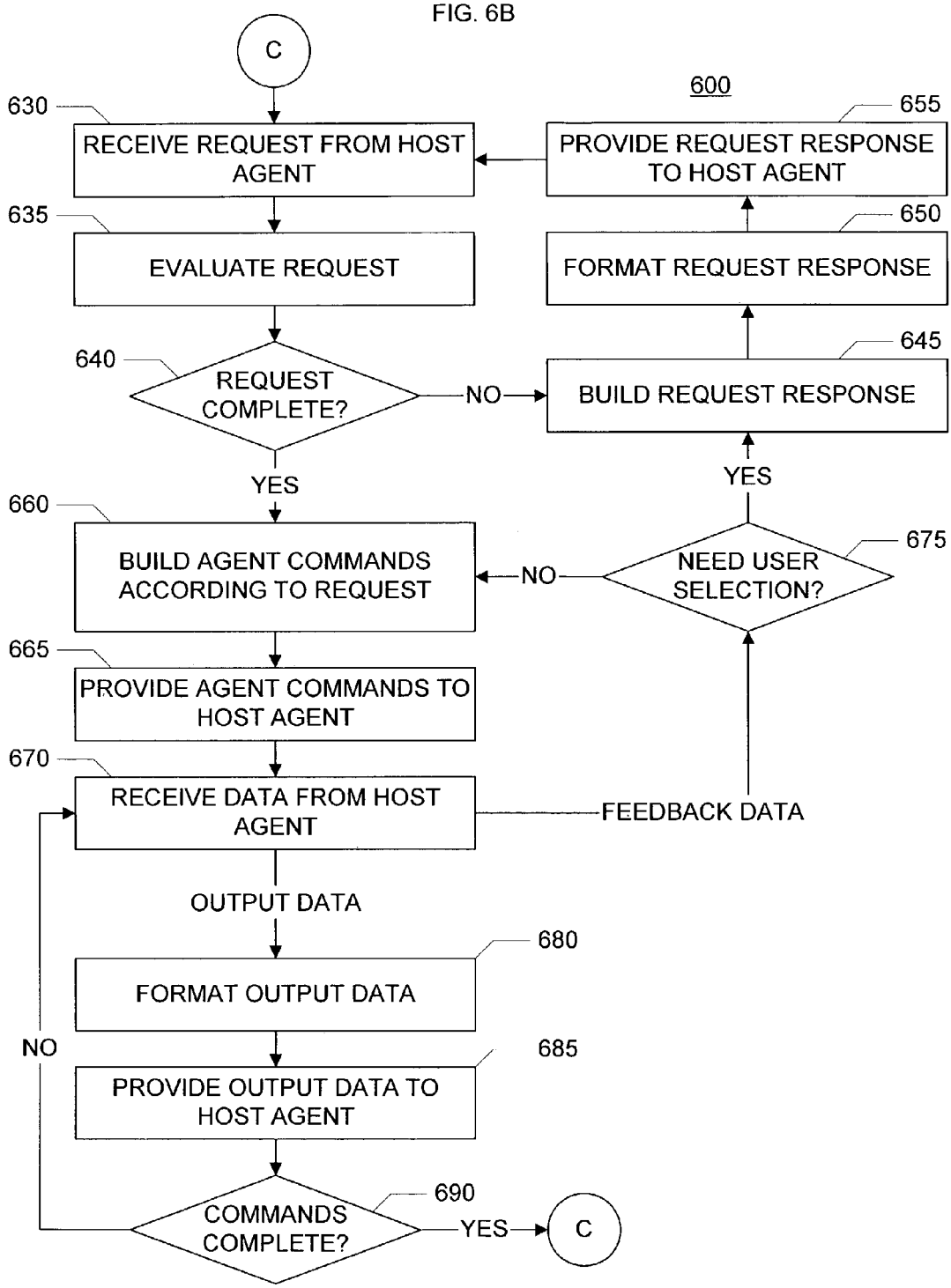

UBIQUITOUS COMPANION AGENT

This application claims the benefit of U.S. Provisional Application 60/429,038, filed Nov. 22, 2002, and U.S. Provisional Application 60/435,182, filed Dec. 19, 2002, the disclosures of which are incorporated herein by reference.

BACKGROUND

Many devices and systems using digital information and content often have different interfaces. Different equipment manufacturers and content providers may have different priorities and techniques for enabling and controlling access, such as in varying DRM (digital rights management) and encryption systems. The consumer is confronted with a large number of products and services that are often each complicated to use and substantially different from one another. However, the manufacturers and providers have difficulty agreeing to standards from a desire for each to protect its own interests. As a result, development and adoption of home networks and other interconnected systems for using digital content have been slowed.

SUMMARY

The present disclosure provides methods and apparatus for controlling and interacting with devices across a network using a ubiquitous companion. In one implementation, a ubiquitous companion includes: an agent interface for communicating with an agent residing on a host device accessible to the companion, and accessing host device data indicating one or more capabilities of the host device; a command interface for building one or more agent commands according to the host device data and a request selection received from a user through the host device; an output interface for providing feedback to the user through the host device in a format that is adapted according to the host device data; and a controller for controlling interaction among the agent interface, the command interface, and the output interface.

In one implementation, a method of processing a user request includes: generating a selection list including one or more requests; formatting the selection list according to the output functionality and input functionality of a host device; providing the formatted selection list to a host agent residing on a host device to present the formatted selection list to a user through the host device; receiving a request selection from the host agent indicating a selection of one of the requests in the selection list by the user through the host device; building one or more agent commands corresponding to the request selection; and providing the agent commands to the host agent.

In another implementation, a method of processing a user request includes: receiving a request from a companion for device data indicating service functionality of a device; retrieving device data from the device; providing the device data to the companion; receiving an agent command from the companion; causing the device to execute the received command; receiving result data from the device; and providing the result data to the companion.

BRIEF DESCRIPTION OF THE DRAWINGS

FIGS. 5A and 5B show a flowchart of one implementation of processing a user request using a companion and a selection list.

FIGS. 6A and 6B show a flowchart of one implementation of processing a user request using a companion without a selection list.

DETAILED DESCRIPTION

Figure 1:
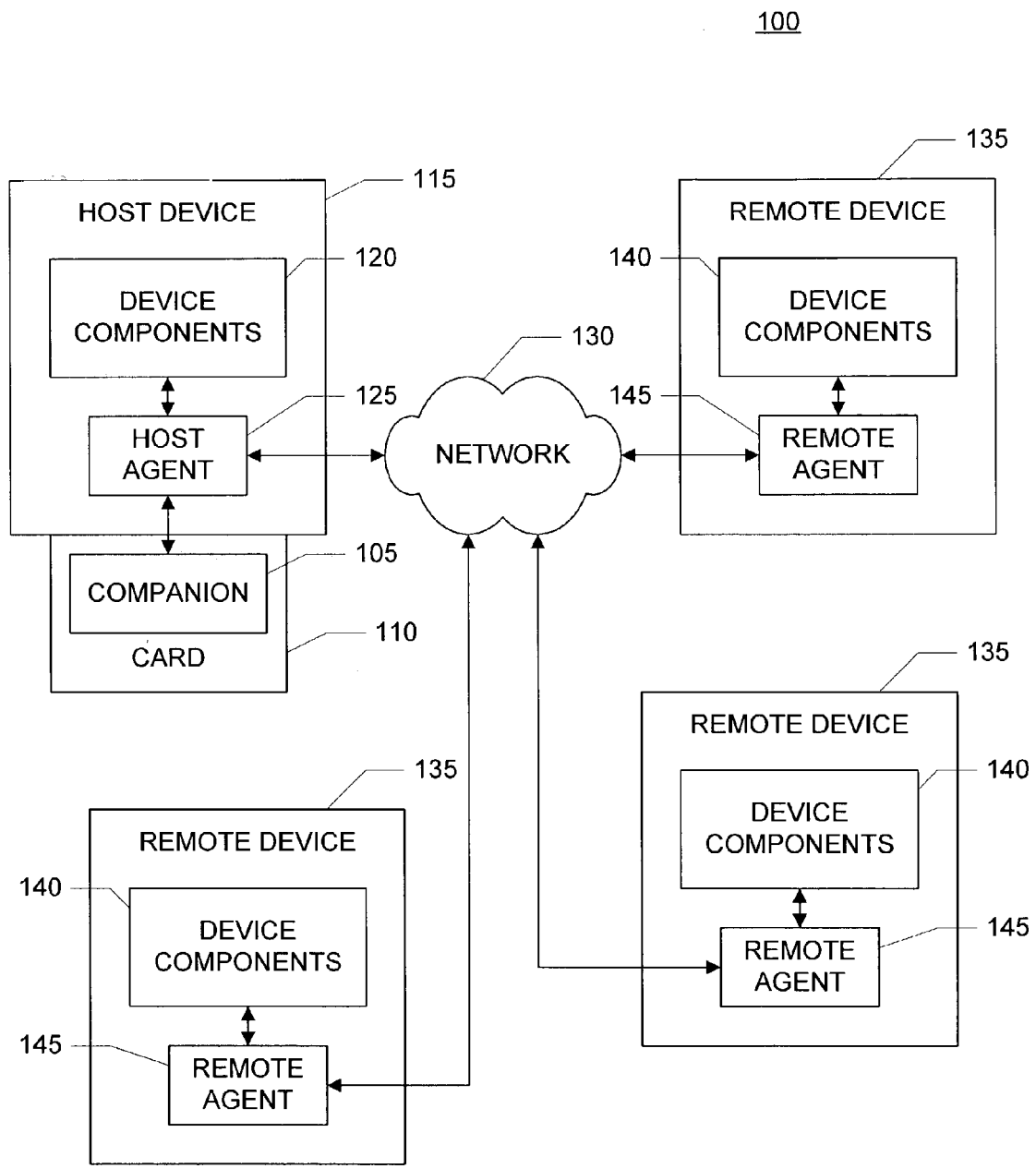
FIG. 1 shows a representation of one implementation of a companion network.

The present invention provides methods and apparatus for controlling and interacting with devices across a network using a ubiquitous companion. The ubiquitous companion offers selections of requests to a user reflecting the functionality of available devices and media, such as consumer electronic devices interconnected in a home network. The user selects requests through the ubiquitous companion and the companion sends appropriate commands to agents operating on appropriate devices to carry out the selected commands. The companion reports the results of the commands back to the user, when appropriate. In addition, the companion is available to be accessed through one or more devices (hence, "ubiquitous companion") and provides an interface according to the capabilities of the host device. Advantageously, the companion allows a user to interact with devices in a uniform and user friendly manner from a convenient location.

The companion provides a representation of the companion for interaction with the user. The representation is presented to the user through the host device on which the companion resides. The representation of interface can be graphical or audio, or a combination of both. Examples of graphical interfaces provided by the companion include, but are not limited to, animated graphics of a celebrity, a movie or television character, a family member, an animal, and a generic person. In one implementation, the user can select a representation according to the user's taste. The companion adjusts and formats the selected or provided representation according to the host device. For example, the companion generates a graphic of a selected animal with audio feedback, adjusting the resolution, color, size, animation, and volume, according to the functionality of the host device.

Through a personalized interface and customization based on user activity, the user can develop a relation ship with the companion (similar to that with a virtual pet) and so the user can enjoy the experience of interacting with the companion more. As a result, the user can enjoy the use of devices accessible to the companion more than through direct access to the device.

Several examples are presented to provide an overview of some capabilities of illustrative implementations of a ubiquitous companion and the agents supporting the companion. The examples described are illustrative and implementations of the companion are not limited to the examples below. Descriptions of the structure and operation of the companion are presented following these examples.

In a first example of one implementation, a companion is a software application stored on a removable memory card, such as the Memory Stick™ offered by Sony Corporation™. A user inserts the memory card into a compatible cellular phone. The companion executes in-place from the card to conserve resources on the phone. The cellular phone includes an agent for interaction between the companion and the phone. The cellular phone provides an interface for the companion using the monochrome display and keypad of the phone. The display of the phone is limited in color and resolution so the companion provides a simple static graphical interface. As an example, the phone can access a home network through a local wireless connection (e.g., Bluetooth) and the home network includes a television, a home audio system, and a game console. The companion provides choices to the user to command each of these devices, such as "Listen to music." The user selects "Listen to music" and the companion retrieves a list of available music, such as by accessing a list of available music for CD's in the audio system. The companion provides the list to the user for selection of music. The user selects an album and the companion sends a command though the phone to an agent residing on the audio system to begin playing the selected album. The user can also control the settings of the audio system through the companion, such as adjusting the volume. Using the companion, the user controlled the home audio system without directly accessing the audio system itself.

In a second example of one implementation, the companion is again a software application stored on a removable memory card and the user has inserted the memory card into a PDA (personal digital assistant), such as a Clié™ offered by Sony Corporation™. The companion provides an interface appropriate to the PDA for user interaction through the agent residing on the PDA. The PDA has a color display and multiple inputs: a keyboard, a touchscreen, a microphone, and a camera. The display is not large, so the companion provides a small animated color interface, such as a person's head (or some other small graphic) and a menu of selections. The user instructs the companion that the user wants to listen to a particular song through the PDA while viewing a collection of images on the display of the PDA. The companion requests a password to authenticate the user for access to the companion. After receiving the proper password, the companion checks stored data to determine whether the PDA has an audio file for the selected music (the song is available in some form or the companion would not have offered the selection to the user). The companion finds that an audio file is not readily available on the PDA or on any of the other accessible devices. However, the stored data does indicate that a CD including the selected music is available through an audio system and that compression/encoding software is available through a computer system. The companion sends commands to the agent residing on the audio system to play the CD and route the audio data to the computer system. The companion sends commands to the agent residing on the computer system to receive the audio data and perform appropriate compression/encoding to generate and return an audio file (e.g., in MP3 format) of the selected song that is appropriate for the capabilities of the PDA and any user preference settings. The companion determines that the requested images are stored on the computer system. The companion sends commands to the agent residing on the computer system to send the selected images to the PDA. When the audio file and images have been received at the PDA, the companion notifies the user that the audio and image data is ready for access. In addition, the companion can provide or use content control such as digital rights management (DRM). For example, the generated audio file can be linked to the particular companion, so that the only way to reproduce (play) the audio file is through the companion that caused the audio file to be created.

In a third example of one implementation, the companion is again a software application stored on a removable memory card and the user has inserted the memory card into a laptop computer, such as a Vaio™ offered by Sony Corporation™. The laptop loads the companion into memory and the companion executes on the laptop. The companion provides an interface appropriate to the laptop for user interaction through the agent residing on the laptop. The laptop has a high resolution color display and a standard computer input interface. The companion provides a full-screen color animated interface using a full body representation of a person (or some other graphic) and a menu for mouse selection of commands. The user instructs the companion that the user wants the television system to block access to television programs that have a rating of TVPG or higher. The companion sends commands to the agent residing on the television system to configure the parental locks on the television system to block access for programs rated TVPG or higher. When a child attempts to view a program with a rating of TVPG the television system blocks the child's access by requesting a password for access. The parent gives the child access to the particular program by inputting the password to the companion on the laptop. The companion forwards the password to the agent residing on the television system allowing the child to view the program. In a variation of this example, the companion sends commands to the television to block one or more channels or programs specifically by name or number, or by time, rather than by rating.

In a fourth example of one implementation, the companion is again a software application stored on a removable memory card and the user has inserted the memory card into a laptop computer, such as a Vaio™ offered by Sony Corporation™. The companion provides an interface appropriate to the laptop for user interaction through the agent residing on the laptop. The laptop has a high resolution color display and a standard computer input interface including a microphone. The companion provides a full-screen color animated interface using a full body representation of a person and solicits voice commands using audio (e.g., by generating audio asking "How may I help you?"). The user instructs the companion using a voice command "Do not allow Billy to play his PS2 after 9 p.m. each night." After the voice command is processed by the agent residing on the laptop (using voice recognition capabilities of the laptop), the companion checks stored data to confirm that the game console (e.g., a PlayStation 2™) provides a lock-out function based on time. By comparison, in a menu selection interface the companion does not need to confirm the availability of selected commands because unavailable selections are not provided to the user for selection. The companion sends commands to the agent residing on the game console to configure the lock-out settings on the game console according to the user's request. When the child ("Billy") attempts to play a game or continue playing a game after 9 p.m., the game console follows its lock-out procedure (e.g., warning the child of imminent shutdown and providing an opportunity to save the game, if appropriate).

In a fifth example of one implementation, the companion is again a software application stored on a removable memory card and the user has inserted the memory card into a laptop computer, such as a Vaio™ offered by Sony Corporation™, at an office location. The laptop has a high resolution color display and a standard computer input interface. The companion while on the laptop provides a full-screen color animated interface using a full body representation of a person and a menu for mouse selection of commands. The laptop and the user's home network are connected to the Internet. The user instructs the companion through the laptop that the user wants the television system and video recording system at home to record a program that begins at 8 p.m. that evening. The companion sends commands through the Internet to the agents residing on the television system and video recording system to record the specified program as requested. The user removes the memory card from the laptop and returns home. At home, the user inserts the card into the television system and the companion is loaded into the television system. The television system has a high resolution color display and receives commands from an infrared remote control device. The companion recognizes (through stored data or interaction with the agent residing on the television system) that the interface functionality available through the television system is different that that of the laptop and so provides a different interface for the user. Accordingly, while on the television system the companion provides a still full body representation of a person and a menu for request selection using the remote control. The user instructs the companion through the television system that the user would like to watch the recorded program. The companion sends commands to the agents residing on the television system and the video recording system to play the recorded program.

FIG. 1 shows a representation of one implementation of a companion network 100. A companion 105 resides on a memory card 110. Companion 105 in FIG. 1 is a software application stored as executable code and data in the storage of memory card 110. In alternative implementations, the companion can be implemented in hardware, firmware, or some combination of software, hardware, and/or firmware. Memory card 110 is a removable memory card including flash ROM storage, such as a Memory Stick™ offered by Sony Corporation™. Memory card 110 is inserted into a port of a host device 115. In alternative implementations, the memory card can be implemented in different forms to store the companion, such as in a portable storage device supporting a wireless connection to the host device. In one implementation, the memory card includes a processor for executing the companion.

Host device 115 is a consumer electronics or computing device, such as, but not limited to, a PDA, cell phone, laptop computer system, desktop computer system, television system, camera system, game console, or network server. Host device 115 includes device components 120 and a host agent 125. Device components 120 provide the functionality of host device 115 (e.g., cell phone functionality including placing and receiving calls, displaying information to a user through a display, and receiving input from a user through a keypad).

Host agent 125 is a software agent residing on host device 115, such as being stored in storage included in device components 120. Host agent 125 provides an interface between companion 105 and host device 115. As described below, companion 105 sends commands and data to and receives data from host device 115 through host agent 125. In an alternative implementation, the companion can interact directly with the host device. Host agent 125 also provides to companion 105 host device data indicating the capabilities of host device 115. The host device data indicates the available input and output functionality of host device 115. For example, the host device data indicates the type of display device (e.g., color depth and resolution) and type of input device (e.g., number and type of keys and other selection devices, such as mouse, touchpad, jog wheel). Companion 105 uses the input and output functionality data in the host device data for formatting data for presentation on the host device. The host device data also indicates the service functionality or capabilities provided by host device 115. For example, the host device data indicates what type of device the host device is (e.g., cell phone, computer, PDA, etc.), what commands are available to send to the host device, and what network connections are available to the host device. Companion 105 uses the service functionality data in the host device data for building a request list for user selection and building commands to control the remote device.

Host device 125 is connected to a network 130. Host device 125 can be connected to network 130 through a wire or wireless connection. Network 130 is a local network, such as a home network. In another implementation, the network is a wider or external network, such as the Internet.

One or more remote devices 135 are also connected to network 130. Three remote devices 135 are shown in FIG. 1, however different numbers of remote devices can be connected to network 130 at different times or in different implementations. Each remote device 135 is a consumer electronics or computing device, similar to host device 115. Each remote device 135 can be a different type of device, or some or ail of the remote devices 135 can be the same type of device. Each remote device 135 includes device components 140 and a remote agent 145. Similar to host device 115, in each remote device 135, device components 140 provide the functionality of the remote device 135, and remote agent 145 is a software agent residing on the remote device 135 and provides an interface for interacting with the remote device 135. Remote agent 145 also provides to companion 105 remote device data indicating the capabilities of the remote device 135 where the remote agent 145 resides. Similar to host device data, the remote device data indicates the input and output functionality of the remote device 135, and the service functionality provided by the remote device 135. Companion 105 uses the service functionality data in the remote device data for building a request list for user selection and building commands to control the remote device. Companion 105 stores the input and output functionality data in the remote device data for when companion 105 is connected to the remote device as a host device. In an alternative implementation, the remote device data does not include input and output functionality data. As described below, companion 105 communicates with a remote device 135 by sending commands and data through host agent 125, host device 115, and network 130 to the remote agent 145 residing on that remote device 135.

In one implementation, one or more of the remote devices 135 includes an interface for receiving memory card 110 where companion 105 resides. In this case, memory card 110 can be removed from host device 115 and inserted into a compatible remote device 135. The receiving remote device becomes a new host device and the former host device becomes a remote device.

Figure 2:
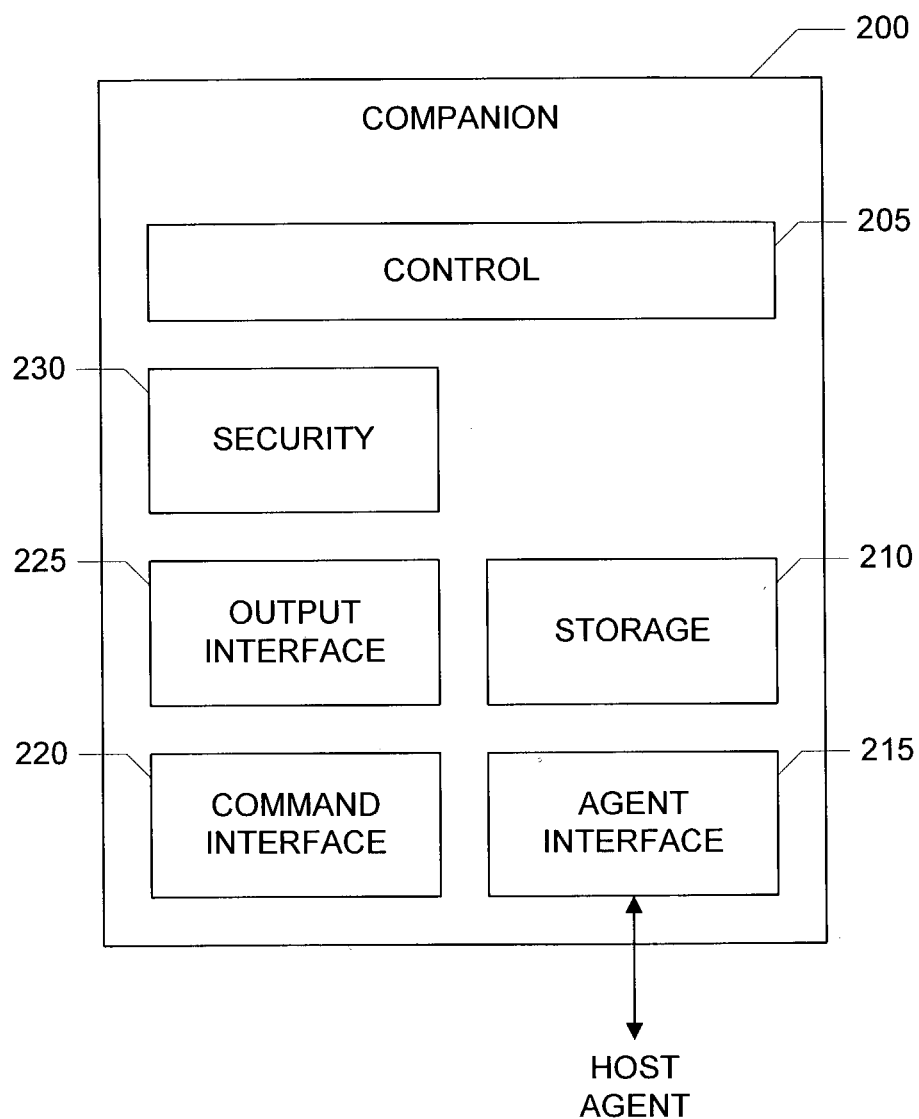
FIG. 2 shows a representation of one implementation of a companion.

FIG. 2 shows a representation of one implementation of a companion 200, such as companion 105 in FIG. 1. As described above, in one implementation, companion 200 is a software application stored in memory of a portable memory device, such as a removable memory card or a smart card including a memory chip. Companion 200 includes a control component 205, storage 210, an agent interface 215, a command interface 220, an output interface 225, and a security component 230. Control component 205 controls the operation of companion 200 and the interaction among the components of companion 200.

Storage 210 stores data for companion 200, such as host device data and remote device data. In one implementation, storage 210 stores device data for each host device companion 200 has used and each remote device to which companion 200 has had access. Storage 210 also stores data about available media and content, such as a list of audio and video files and the location and status of each. As described below, in one implementation, the companion also stores history information of requests and selections made by the user for future use. Storage 210 is an allocation of memory set aside for storing data for companion 200. In another implementation, storage 210 is a memory device.

Agent interface 215 provides the interface for communication between companion 200 and the host agent residing on the host device to which companion 200 is connected (recall host agent 125 and host device 115 in FIG. 1). Companion 200 sends data and commands to the host device and host agent through agent interface 215 and receives data from the host device and host agent through agent interface 215 (because the host agent resides on the host device, data to and from the host agent initially passes through the host device to be passed to the host agent or to the companion). In an alternative implementation, the companion interacts directly with the host device without using an agent (e.g., where the companion is embedded in the host device).

Command interface 220 builds commands to send to the host agent according to request selections received from the host agent. Command interface 220 uses the stored host device data and remote device data to build commands to be sent to appropriate devices to fulfill the received request selection. As described below, a user selects a request from a selection list using the host device and the host agent provides the request selection to the companion.

Output interface 225 generates formatted output data for presentation on the host device. The formatted output data is data to be presented to the user, such as to solicit a selection or request from the user or inform the user of the result of a user request. The formatted output data can be video or audio data, or a combination thereof. Output interface 225, in conjunction with storage 210 and controller 205, generates the representation of the companion for the user including feedback information. Companion 200 receives data for output to the host device from the host agent, such as in response to commands. Output interface 225 uses the host device data to format the output data. Output interface 225 also uses the device data for the device from which the output data originated to interpret the output data. Output interface 225 also formats output data for presenting selections and interacting with the user according to internal commands from control 205 and data received from the host agent.

Security component 230 provides access and content control for companion 200. For access control, security component 230 authenticates a user before performing requests for a user, such as by using a password or biometric verification. Security component 230 authenticates a user according to the functionality of the host device, selecting an authentication process that is compatible with the host device. For example, if a camera is not available in the host device, the security component does not use a visual face recognition process, but instead requests a text or audio password. Security component 230 also provides content control, such as by using a digital rights management (DRM) system. In one implementation, security component 230 provides a common interface for the user for multiple DRM systems used with different content and devices from different providers and manufacturers.

Figure 3:
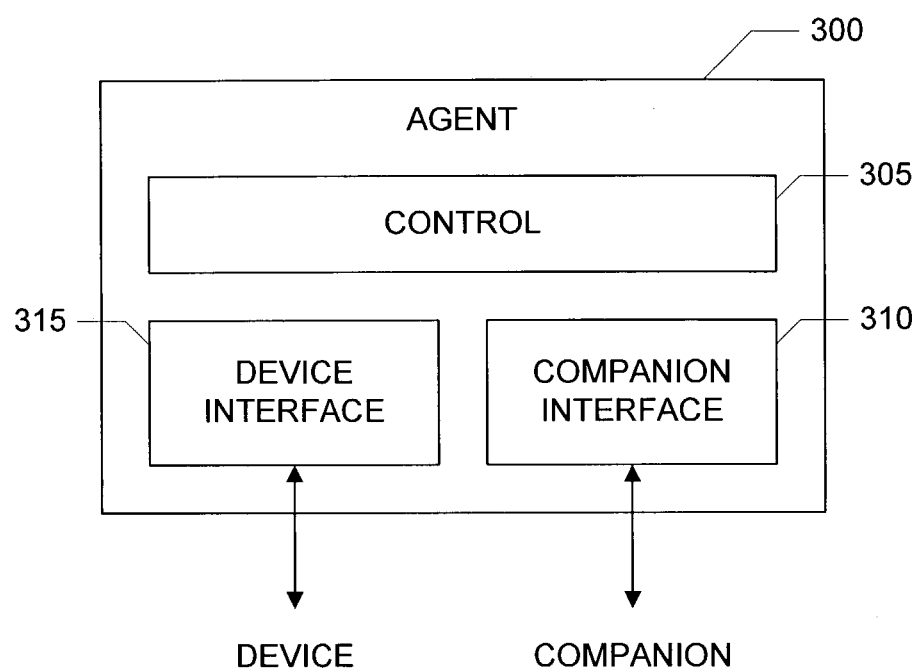
FIG. 3 shows a representation of one implementation of an agent.

FIG. 3 shows a representation of one implementation of an agent 300, such as host agent 125 or remote agent 145 in FIG. 1. As described above, in one implementation, agent 300 is a software application stored in memory of a consumer electronics device or computer system, such as a PDA, cell phone, or laptop. Agent 300 includes a control component 305, a companion interface 310, and a device interface 315. Control component 305 controls the operation of agent 300 and the interaction among the components of agent 300. Companion interface 310 provides the interface for communication between agent 300 and a companion connected to or residing on the same device as agent 300 (e.g., when agent 300 is a host agent; recall companion 105 and host agent 125 in FIG. 1). Agent 300 sends data and commands to the companion through companion interface 310 and receives data from the companion through companion interface 310 (because the host agent resides on the host device, data to and from the companion initially passes through the host device to be passed to the companion or to the agent). Device interface 315 provides the interface for communication between agent 300 and the device on which agent 300 resides. Agent 300 sends data and commands to the device through device interface 315 and receives data from the device through device interface 315. In an alternative implementation, the companion interface and the control component are merged so that the agent communicates with a companion through the device interface using appropriate commands. In another implementation, agent 300 also includes storage for storing device data for the device on which agent 300 resides.

Figure 4:
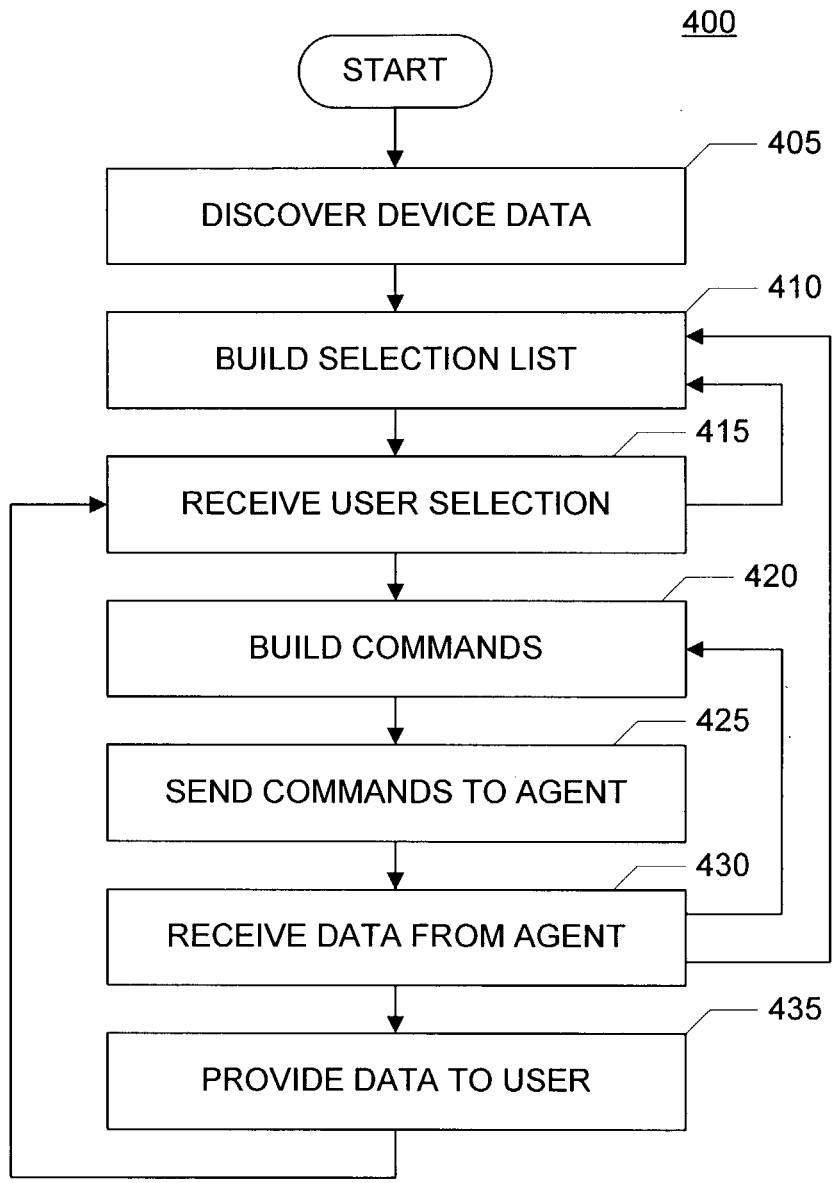
FIG. 4 shows a flowchart of one implementation of processing a user request using a companion.

FIG. 4 shows a flowchart 400 of one implementation of processing a user request using a companion. When the companion is connected to a host device, the companion discovers device data for the host device and the available remote devices, block 405. As described above, the device data indicates the input and output functionality and the service functionality of the device. In one implementation, the companion retains the data in the device list for future use (e.g., for the next time the companion is connected to a host device or activated). The companion uses the device data to build and format a selection list of requests for selection by the user, block 410. The selection list includes selections of actions or information, such as a request to play music, record a television program, or access a website. The companion uses the service functionality data of the host device and remote devices to determine what requests are available. For example, in one implementation, the companion builds a list of the service functions provided by each of the devices available. The companion uses the input and output functionality to format the selection list. For example, in one implementation, the companion uses the display size and resolution to determine how many selections to include in the selection list and uses the type of input device available to determine how to label or identify the selections (e.g., a menu of numbered choices for selection by number, or a set of buttons for selection by mouse or stylus). As described below, in one implementation, the companion also builds additional selection lists in response to previous selections. In one implementation, the companion uses stored user preferences or settings, or history information, to build the selection list. In another implementation, the companion uses priorities established by a third party (e.g., the companion manufacturer, a device manufacturer, or a content provider) to organize and present selections. For example, the companion receives priorities from one or more remote devices and uses the priorities for ordering the choices in the selection list. The companion provides the formatted list to the host agent on the host device and the host device presents the selection list to the user.

The user selects a request from the selection list through the host device and the host agent sends the selection to the companion, block 415. The user selects a request from the selection list using the input mode or component of the host device (e.g., selecting an item in a list using a touchscreen of a PDA). The host device indicates to the host agent the user's selection, and the host agent passes the selection to the companion. For example, each item in the list has an assigned code and the host agent returns the code to the companion. If the companion needs additional information to complete the request, the companion builds another selection list and provides the list to the host agent, returning to block 410. For example, the user has selected "Listen to music" from the selection list, and the companion builds another selection list of available albums for the user to select a particular album for listening.

The companion builds one or more agent commands to fulfill the completed request, block 420. The companion designates one or more devices as target devices to fulfill the request. The companion uses the collected device data to select the target devices and to select the commands to send to the target devices. The built commands are commands to be received by the agents residing on the target devices so that those agents will cause the devices to perform functions to fulfill the request. The agent commands to be executed on the host device are host commands and the agent commands to be executed on remote devices are remote commands. In one implementation, the companion builds a list of commands to be sent in sequence or a command tree reflecting a series of commands having branches depending on responses received from the target devices.

The companion sends the built agent commands to the agents residing on the target devices, block 425. The companion sends agent commands to the host agent. The host agent executes host commands on the host device. The host agent forwards remote commands through the host device to the target remote device.

The companion receives result data back from the agents on the target devices, block 430. If the request has been fulfilled, the result data is output data. Output data is data to be presented to the user, such as the result of a command or request, or confirmation of the completion of a request. The companion can also generate output data or add data to the output data, such as to generate a confirmation of completion message. If the request has not been completely fulfilled, the result data includes either or both feedback data and output data. Feedback data is data to be used by the companion in building additional commands to fulfill the request. In one implementation, feedback data can also include confirmation of completion of a command and this confirmation data may or may not cause additional commands to be generated. If the feedback data indicates additional commands are needed to fulfill the request, the companion uses the feedback data to build additional commands, returning to block 420. If the feedback data indicates additional user input is needed to fulfill the request, the companion uses the feedback data in building a new selection list, returning to block 410.

The companion presents output data from executing the agent commands to the user, block 435. The companion formats output data received from the host agent and remote agents using the input and output functionality data in the host device data. The companion provides the formatted output data to the host agent for presentation to the user through the host device. The companion presents the top-level selection list again to the user and waits for another selection of a request, returning to block 415.

Figure 5A:
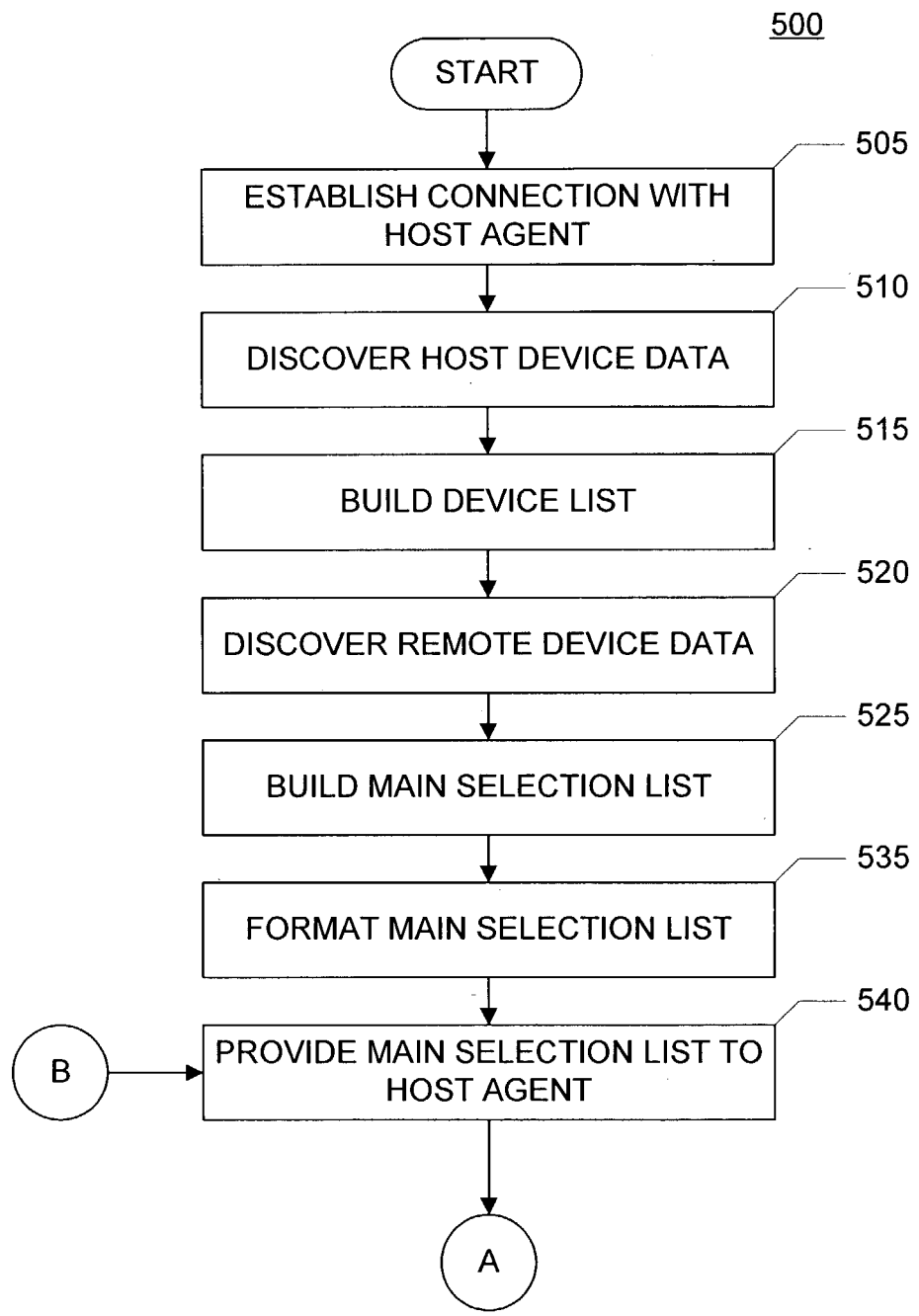

FIGS. 5A and 5B show a flowchart 500 of one implementation of processing a user request using a companion and a selection list. Flowchart 500 includes branching to illustrate the flow of operation in the companion. Flowchart 500 is divided into two portions across FIGS. 5A and 5B for space on the page. The two portions are linked using circle indicators A and B.

The companion establishes a connection with the host agent residing on the host device connected to the companion, block 505. As described above, in one implementation, the companion is stored on a portable memory device, such as a memory card, and the portable memory device is connected to or inserted into a host device. For example, a memory card storing the companion is inserted into a memory card slot or port in a PDA. The companion executes in place on the portable memory device, using the processor of the host device but using the memory of the portable memory device. In another implementation, the companion determines the available memory in the host device and if the available memory is above a memory threshold (e.g., an amount of memory sufficient to store the companion and working memory for the companion's operation), the companion is loaded into the host device memory and executes from the host device memory. If there is not sufficient memory, the companion executes in place from the portable memory device.

The companion initiates communication with the host agent and discovers the host device data, block 510. As described above, the host device data indicates the input, output, and service functionality of the host device. The companion retrieves device identification information from the host agent to identify the host agent and host device. The companion stores device data for host devices that have been used previously and so checks to determine whether host device data for this host device has already been stored. If the companion does not have previously stored host device data for this host device, the companion requests host device data from the host agent.

The companion builds a device list of available devices, block 515. The companion maintains a list or table of devices that have been accessed in the past. The companion also requests a list of available devices from the host agent. The companion updates the stored list of devices with changes indicated by the list returned by the host agent. The companion checks if each of the devices in the updated list is currently available by polling the devices through the host agent. The companion updates the list again to indicate which devices are currently available. In another implementation, the companion sends a broadcast message to all devices accessible by the host device through the host agent. The companion evaluates the replies to form or update the device list. In another implementation, the companion periodically updates the device list, such as by polling the devices on the device list or sending broadcast messages.

The companion discovers remote device data for each device in the device list, block 520. As described above, remote device data indicates the service functionality of the remote device. Similar to the device list, the companion stores device data for devices as the companion receives device data. For any remote devices in the device list which the companion does not have stored remote device data, the companion requests remote device data from the remote device through the host agent. In another implementation, the remote device data also indicates the input and output functionality of the remote device. The companion stores the input and output functionality data for a remote device for future use, such as when the companion is moved to a remote device to use the remote device as a host device.

The companion builds a main selection list, block 525. The main selection list is a list or collection of requests for selection by a user through the host device. The main selection list is a top-level list and so is the first list presented to the user for selection. The companion uses the discovered host and remote device data to build or update a command table of available commands or functions for the available devices. The companion uses the command table to determine the available requests and to build the main selection list. The companion also uses content data to determine what types of content are available and for building the main selection list.

The companion formats the main selection list using the input and output functionality data for the host device, block 530. As described above, the companion builds a selection list that is appropriate for the input and output functionality of the host device. For example, if the host device has a color display, the selection list can include color elements. If the host device has audio output, the selection list can be presented by sound in addition to or instead of images. If the host device has a mouse for input selection, the selection list can be formed from a collection of buttons. In another implementation, the companion also uses user preference settings to organize the main selection list.

The companion provides the formatted main selection list to the host agent for presentation to the user by the host device, block 535. The host agent causes the host device to present the main selection list to the user according to the formatting set by the companion.

The companion receives a request selection from the host agent, block 540. The user selects a request from the selection list presented through the host device. For example, the user selects a request using a mouse or keypad of the host device. The host device passes the selection to the host agent and the host agent passes the selection to the companion. The companion stores request data indicating the request selection. If the received selection is a selection from a sub-selection list (described below), the companion adds the request data to the previously stored request data.

The companion determines whether the request is complete or not, block 545. If the selected request provides enough information for the companion to fulfill the request, the request is complete. If additional information is needed to fulfill the request, the request is not complete. For example, the request "Turn off the television" is complete. The request "Listen to music" is not complete because the user has not specified the music. In one implementation, each selection in a selection list includes a code indicating whether that selection completes a request or not.

If the request is not complete, the companion builds a sub-selection list, block 550. The sub-selection list includes selections to complete or further complete the request. The companion builds the sub-selection list in the same way as the main selection list (recall block 525), using the device data of the available devices and any additional content data. For example, when the request from the main selection list is "Listen to music" the companion builds a sub-selection list indicating available music. In another implementation, the companion builds a series of sub-selection lists to select an album (e.g., from general to specific genres and then specific albums, or alphabetical groupings). In another implementation, the companion uses user history to order the selections, so that more commonly accessed selections are placed higher up or more prominently.

The companion formats the sub-selection list using the host device data, block 555, as described above referring to formatting the main selection list (recall block 530). The companion provides the formatted sub-selection list to the host agent for presentation to the user through the host device, block 560, as described above (recall block 535), and waits for a selection from the user, returning to block 540.

From block 545, if the request is complete, the companion builds one or more agent commands to fulfill the selected request, block 565. The companion builds the commands using the stored request data and the command table. The request data indicates the specifics of the request. The command table indicates what device or devices will be used to fulfill the request and what commands to send to those devices. The companion designates one or more devices as target devices to fulfill the request. The companion builds a set of agent commands to be sent to the agents on the target devices. The agent commands to be executed on the host device are host commands and the agent commands to be executed on remote devices are remote commands. For example, when the completed request is "Listen to music, album X", the companion determines which device to use. In this example, an audio system can play music and has a juke box feature to play a selected album from an array of discs storing music. In addition, the audio system has a disc storing the indicated album. Accordingly, the companion builds commands to send to the agent residing on the audio system to cause the audio system to access the selected album and begin playing the album. For a request that uses multiple devices, the companion builds agent commands to send to each of the target devices. For example, when the request is to download pictures from a laptop computer and a desktop computer to a PDA and display the pictures on the PDA, the companion builds commands for the laptop computer and the desktop computer to request the pictures and, once the pictures have been received by the PDA, builds commands for the PDA to display the pictures.

The companion sends the built agent commands to the target devices through the host agent, block 570. The companion provides the agent commands to the host agent with information indicating the target device for each agent command. For agent commands for a remote device, the host agent causes the host device to send the remote commands to the indicated remote device, such as through a network. For agent commands for the host device, the host agent causes the host device to execute the host commands.

The companion receives data back from the host agent for the agent commands, block 575. The data received includes feedback data or output data, or both. As described above, output data is data to be presented to the user and feedback data is data to be used by the companion in building additional commands to fulfill the request. If additional commands or data are needed to fulfill the request, the received data includes feedback data.

If the companion has received feedback data for additional commands to fulfill the request, the companion determines whether additional user input is needed to fulfill the request, block 580. If additional user input is needed, the companion uses the feedback data to build a sub-selection list, returning to block 550. If additional user input is not needed, the companion uses the feedback data to build additional agent commands, returning to block 565. For example, when the request is "Listen to music" and the user has selected a particular album, if the companion receives feedback data indicating that the selected album is not available on the target device, but the companion has stored data indicating that the album is available on a second target device, the companion builds additional agent commands for the second target device to play the selected album. In this case, additional user input was not needed. However, if the companion receives feedback data indicating the selected album is not available on any target device, the companion builds a sub-selection list for the user to select a different album or choose another activity.

For output data, the companion formats the output data, block 585. The companion formats output data received from the host agent and remote agents using the input and output functionality data in the host device data, similar to formatting the selection lists, as described above.

The companion provides the formatted output data to the host agent for presentation to the user through the host device, block 590. The host agent provides the output data to the host device and the host device presents the output data to the user through the output components of the host device The companion determines whether all the commands for the request have completed or not, block 595. If additional commands are still executing or data is still to be received from a target device, the companion waits for the data for the pending commands, returning to block 575. If all the data has been received for the commands and the request has been fulfilled, the companion presents the main selection list again to the user and waits for another selection of a request, returning to block 535.

FIGS. 6A and 6B show a flowchart 600 of one implementation of processing a user request using a companion without a selection list. Flowchart 600 shows a process similar to that of flowchart 500, however a selection list is not presented to the user. Accordingly, a user places a request using an open-ended selection interface, such as a speech recognition system or a command prompt for text entry. Alternatives described above also apply to flowchart 600, as appropriate. Flowchart 600 is divided into two portions across FIGS. 6A and 6B for space on the page. The two portions are linked using circle indicator C.

The companion establishes a connection with the host agent residing on the host device connected to the companion, block 605. As described above, in one implementation, the companion is stored on a portable memory device, and the companion executes in place on the portable memory device while the portable memory device is connected to the host device.

The companion initiates communication with the host agent and discovers the host device data, block 610. As described above, the host device data indicates the input, output, and service functionality of the host device. The companion retrieves device identification information from the host agent to identify the host agent and host device. If the companion does not have previously stored host device data for this host device, the companion requests host device data from the host agent.

The companion builds a device list of available devices, block 615. As described above, the companion maintains a list or table of devices that have been accessed in the past and requests a list of available devices from the host agent to update the stored list. The companion checks if each of the devices in the updated list is currently available by polling the devices through the host agent. The companion updates the list again to indicate which devices are currently available. The companion evaluates the replies to update the device list.

The companion discovers remote device data for each device in the device list, block 620. As described above, remote device data indicates the input, output, and service functionality of the remote device. The companion stores device data for devices as the companion receives device data. For any remote devices in the device list which the companion does not have stored remote device data, the companion requests remote device data from the remote device through the host agent.

The companion builds a command table, block 625. The companion uses the discovered host and remote device data to build or update a command table of available commands or functions for the available devices. The companion uses the command table to determine the available requests and to interpret received user requests. The companion also uses content data to determine what types of content are available and for building the command table.

The companion receives a request from the host agent, block 630. The user provides a request through the input components of the host device. For example, the user makes a request by speaking a request into a speech recognition system of the host device or entering text into a natural language text interface of the host device. The host device processes the request and passes the request to the host agent. The host agent passes the request to the companion. The companion stores request data indicating the request. If the received request is a response to a request response (described below), the companion adds the request data to the previously stored request data.

The companion evaluates the request, block 635. The companion uses the command table to evaluate the request data. The companion determines whether the request is complete or not, block 640. The companion determines if the request is available (e.g., a device having appropriate functionality is available) and if additional information is needed to fulfill the request. If the request is available and provides enough information for the companion to fulfill the request, the request is complete. If the request is not available or additional information is needed to fulfill the request, the request is not complete. For example, the request "Turn on the television" is not complete if a television is not an available target device.

If the request is not complete, the companion builds a request response, block 645. The request response includes information indicating why additional information is needed (e.g., "That device is not available.") or information indicating what additional information is needed to complete or further complete the request (e.g., "What album would you like to listen to?"), or both. The companion builds the request response in using the device data of the available devices, content data, and the request data. For example, when the request is "I want to listen to music" the companion builds a request response requesting more information (e.g., "What album would you like to listen to?") or indicating available music ("Would you like to listen to album X?"). In another implementation, the companion builds a series of responses to select an album (e.g., "What type of music would you like to listen to?", then when the user requests jazz "What type of jazz would you like to listen to?").

The companion formats the request response using the host device data, block 650, as described above referring to formatting the main and sub-selection list in flowchart 500. For example, the host device includes audio output components (e.g., a speaker) and the companion formats the request response as audio (e.g., spoken words). The companion provides the formatted request response to the host agent for presentation to the user through the host device, block 655, and waits for a selection from the user, returning to block 630.

From block 640, if the request is complete, the companion builds one or more agent commands to fulfill the request, block 660. The companion builds the commands using the stored request data and the command table. As described above, the request data indicates the specifics of the request and the command table indicates what device or devices will be used to fulfill the request and what commands to send to those devices. The companion designates one or more devices as target devices to fulfill the request. The companion builds a set of agent commands to be sent to the agents on the target devices. The agent commands to be executed on the host device are host commands and the agent commands to be executed on remote devices are remote commands.

The companion sends the built agent commands to the target devices through the host agent, block 665. The companion provides the agent commands to the host agent with information indicating the target device for each agent command. The host agent causes the host device to send the remote commands to the indicated remote device, and causes the host device to execute the host commands.

The companion receives data back from the host agent for the agent commands, block 670. The data received includes feedback data or output data, or both. As described above, output data is data to be presented to the user and feedback data is data to be used by the companion in building additional commands to fulfill the request. If additional commands or data are needed to fulfill the request, the received data includes feedback data.

If the companion has received feedback data for additional commands to fulfill the request, the companion determines whether additional user input is needed to fulfill the request, block 675. If additional user input is needed, the companion uses the feedback data to build a request response, returning to block 645. If additional user input is not needed, the companion uses the feedback data to build additional agent commands, returning to block 660.

For output data, the companion formats the output data, block 680. The companion formats output data received from the host agent and remote agents using the input and output functionality data in the host device data, similar to formatting the request responses and selection lists, as described above.

The companion provides the formatted output data to the host agent for presentation to the user through the host device, block 685. The host agent provides the output data to the host device and the host device presents the output data to the user through the output components of the host device The companion determines whether all the commands for the request have completed or not, block 690. If additional commands are still executing or data is still to be received from a target device, the companion waits for the data for the pending commands, returning to block 670. If all the data has been received for the commands and the request has been fulfilled, the companion waits for another request, returning to block 630.

Figure 7:
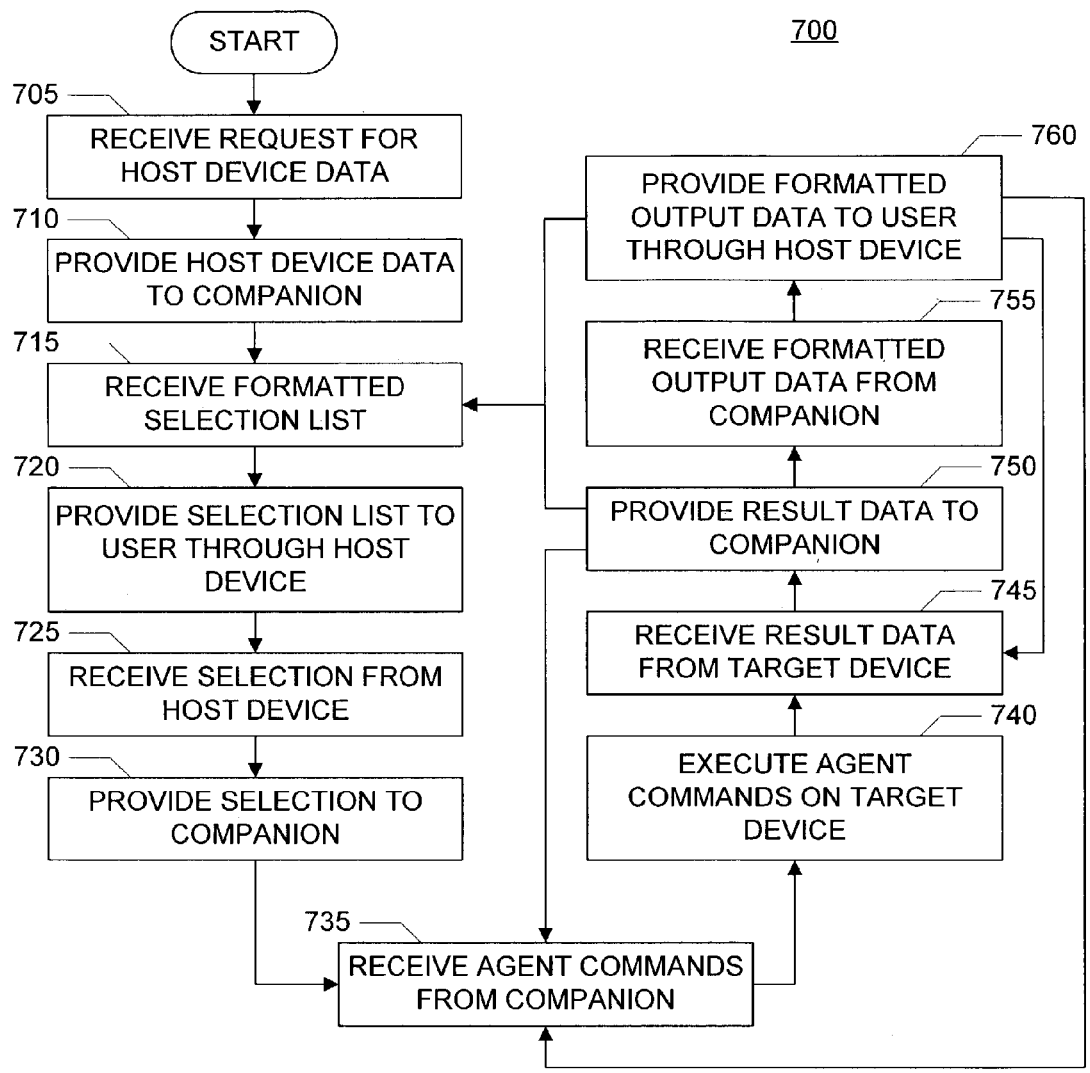
FIG. 7 shows a flowchart of one implementation of a host agent processing a user request with a companion using a selection list.

FIG. 7 shows a flowchart 700 of one implementation of a host agent processing a user request with a companion using a selection list. As described above, a host agent is an agent residing on the host device to which the companion is connected. When the companion is connected to the host device and has established communication, the host agent receives a request for host device data, block 705. As described above, the host device data indicates the input, output, and service functionality of the host device. In one implementation, the host agent first receives a request from the companion for identification information identifying the host agent and host device. If the companion does not already have stored device data for the host device indicated by the identification information, the companion requests the host device data from the host agent.

The host agent provides the host device data to the companion, block 710. The host agent retrieves the host device data from the host device or from storage and provides the host device data to the companion. The host agent is a software application executing on the host device and so operates by controlling the host device to perform functions and communicate with the companion. Accordingly, to send data to the companion, the host agent sends the data through the host device and the device where the companion resides (e.g., a memory card inserted into the host device). Similarly, the host agent receives data from the companion through the host device. The host agent communicates with remote devices through the host device as well. In one implementation, all communication between the companion and the remote agents and devices passes through the host agent. In this case, the companion sends requests to remote devices for remote device data through the host agent as well. The companion processes the device data as described above (e.g., recall block 510 in FIG. 5).

The host agent receives a formatted selection list from the companion, block 715. The selection list is formatted for the input and output functionality of the host device. The host agent provides the selection list to the user through the host device, block 720. The host agent causes the host device to present the selection list to the user using the output components of the host device (e.g., using a display screen).

The host agent receives a request selection from the host device, block 725. The user selects a request from the selection list through the input components of the host device (e.g., using a touchscreen or keypad). The host device then provides the selection to the host agent. In one implementation, the host agent confirms the correspondence between the selection and a request in the selection list, such as by determining a request code corresponding to the user selection. The host agent provides the request selection to the companion, block 730. The companion processes the request selection as described above (e.g., recall block 540 in FIG. 5).

The host agent receives one or more agent commands from the companion, block 735. The host agent determines if an agent command is a host command or a remote command. As described above, host commands are for the host device and remote commands are for remote devices.

The host agent causes the target devices to execute the agent commands, block 740. For host commands, the host agent causes the host device to execute the host command. For remote commands, the host agent sends the remote command to the target remote device through the host device. The target device executes the agent command and provides the result data for the command to the host agent, block 745. The host agent provides the result data to the companion, block 750. The companion processes the result data as described above (e.g., recall block 575 in FIG. 5). If the host agent receives additional agent commands, the host agent returns to block 735 to process the agent commands.

When the host agent receives formatted output from the companion, block 755, the host agent provides the output data to the user through the host device, block 760. Similar to the selection list, the host agent causes the host device to present the output data to the user though the output components of the host device. When the host agent receives additional selection lists, agent commands, or result data from remote devices, the host agent returns to the appropriate block of flowchart 700 for processing.

Figure 8:
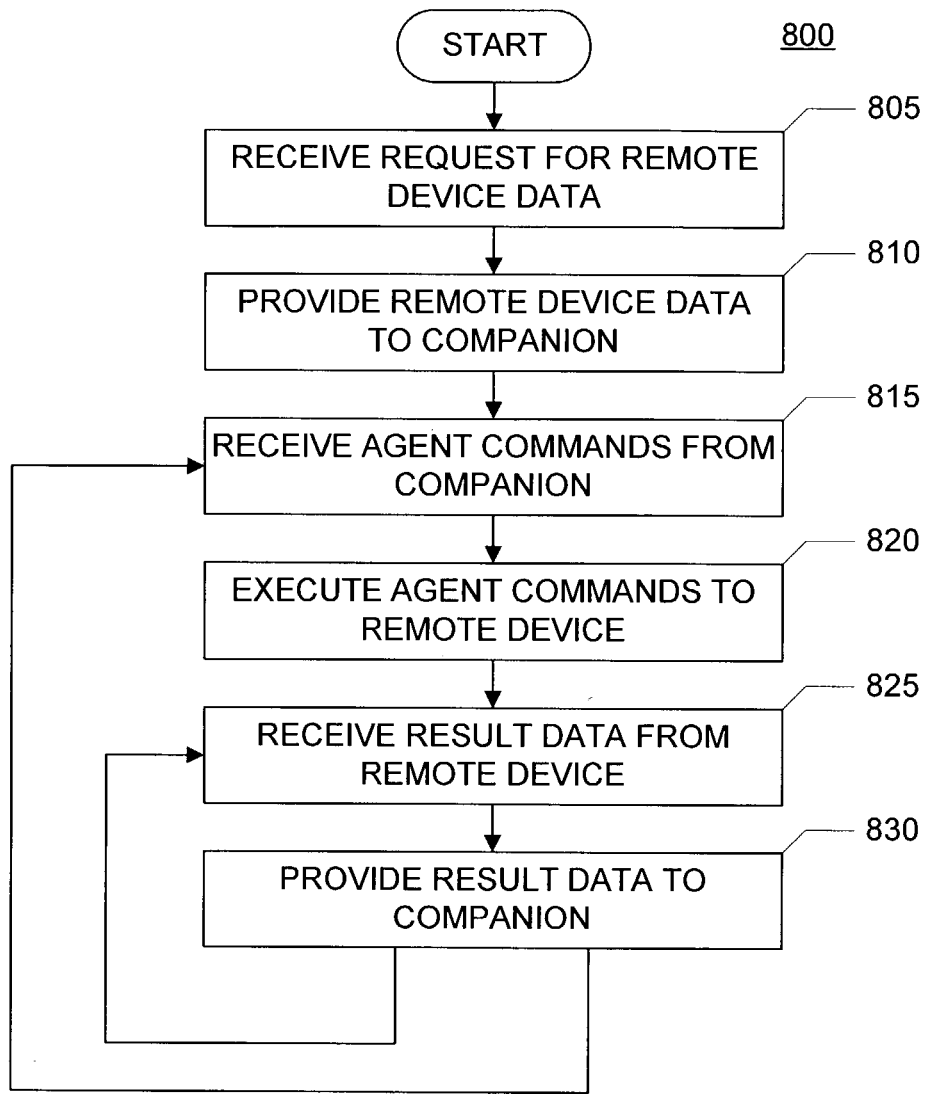
FIG. 8 shows a flowchart of one implementation of a remote agent processing a user request with a companion.

FIG. 8 shows a flowchart 800 of one implementation of a remote agent processing a user request with a companion. As described above, a remote agent is an agent residing on a remote device. When the companion is connected to the host device and has established communication with the host agent, the remote agent receives a request for remote device data, block 805. As described above, the remote device data indicates the input, output, and service functionality of the remote device. In one implementation, the remote agent first receives a request from the companion for identification information identifying the remote agent and remote device. If the companion does not already have stored device data for the remote device indicated by the identification information, the companion requests the remote device data from the remote agent.

The remote agent provides the remote device data to the companion, block 810. The remote agent retrieves the remote device data from the remote device or from storage and provides the remote device data to the companion. The remote agent is a software application executing on the remote device and so operates by controlling the remote device to perform functions and communicate with the companion. Accordingly, to send data to the companion, the remote agent sends the data through the remote device to the host device where the companion resides (e.g., a memory card inserted into the host device). Similarly, the remote agent receives data from the companion through the remote device. The remote agent communicates with the host device and other remote devices through the remote device as well. The companion processes the device data as described above (e.g., recall block 510 in FIG. 5).

The remote agent receives one or more agent commands from the companion, block 815. The remote agent causes the remote device to execute the agent commands, block 820. The remote device executes the agent command and provides the result data for the command to the remote agent, block 825. The remote agent provides the result data to the companion through the host agent, block 830. The companion processes the result data as described above (e.g., recall block 575 in FIG. 5). When the remote agent receives additional agent commands or result data, the remote agent returns to the appropriate block of flowchart 800 for processing.

In alternative implementations, the companion includes additional or alternative features. In one implementation, a group of people each have a respective companion for controlling devices in the same network. For example, each member of a family has a respective companion for controlling the devices connected in a home network. The companions include user settings to customize the interface for each user. For example, a child in the family prefers to have the companion interface present an animated image of a popular character from a television program. An adult in the family, however, prefers to have a text-only interface. The companions interact with the agents on the devices in the network and also with one another to coordinate activity and operation of the devices. For example, the companions for two users can act together as a broker or intermediary to set up a network game between the users. The companions can include priority levels to resolve conflicts between differing instructions for the same device. The companions can use one another as remote agents. The companions can exchange data and facilitate communication between users, such as providing text messaging, email, or file exchanges. In another implementation, the companions provides these communication features for interaction with companions in other networks as well. The companions can also include restrictions to limit with which other companions a companion can interact, such as by using specific identifiers or user profiles exchanged among companions.

In one implementation, the companion sends commands directly to devices without using agents. The companion directly controls the devices and builds the particular commands for each device. In another implementation, the companion uses a combination of direct commands and agents to control devices.

Figure 9:
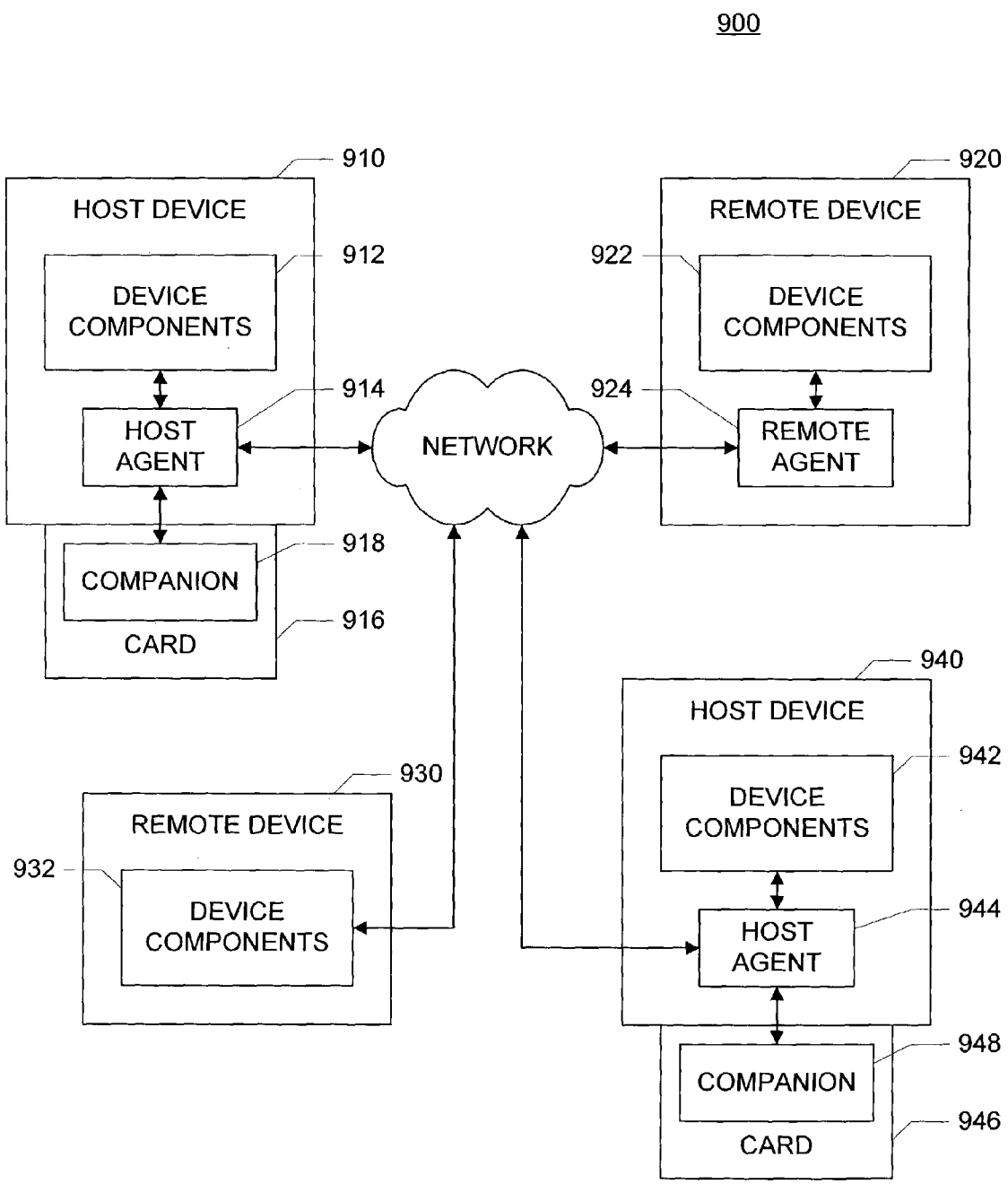
FIG. 9 shows a representation of one implementation of a companion network.

FIG. 9 shows a representation of one implementation of a companion network 900. Companion network 900 is similar to companion network 100 shown in FIG. 1. In companion network 900, a first host device 910, a first remote device 920, a second remote device 930, and a second host device 940 are interconnected by a network 950. First host device 910 includes device components 912, a host agent 914, a memory card 916, and a first companion 918 residing on memory card 916. First remote device 920 includes device components 922 and a remote agent 924. Second remote device 930 includes device components 932, but does not include an agent. Second host device 940 includes device components 942, a host agent 944, a memory card 946, and a second companion 948 residing on memory card 946. First companion 918 and second companion 948 can interact with one another and control the remote devices 920, 930. The companions 918, 948 interact with first remote device 920 through remote agent 924 and interact with second remote device 930 directly.

In another implementation, the companion is a single entity on the network residing on a central server. The central companion runs multiple processes to provide a respective instance for each user requesting service. Each user has a profile to define information relevant to the user, such as interface preferences and access rights, similar to a network profile.

In another implementation, the companion resides on a single portable memory device and is loaded into the network. The companion moves among devices on the network to most efficiently access available resources. The companion uses the input and output functionality of the current host device (e.g., updating the host device data with each transfer) for interaction with the user. In this way, copies of the companion or profiles of the companion are distributed throughout the network. To access the companion, initial access can be limited by requiring the presence of the portable memory device.

In one implementation, the companion includes an access security feature. The companion requires a user to enter a password before the companion provides a selection list or accepts certain requests from the user. The password can take various forms, including, but not limited to, an alphanumeric code, an audio signature (e.g., a spoken word), a biometric signature (e.g., a fingerprint or retina pattern), or a combination of forms. In another implementation, the access is controlled using a physical key, such as a magnetic card.

In another security implementation, the companion has a restricted set of devices that can be controlled. The companion stores a list of approved devices and only uses those devices in the device list for building selection lists and commands. In another implementation, the companion has an access level or code and each device has a minimum access level. If the companion's access level is below the access level for a device, the companion cannot control that device. This type of restriction is useful for limiting access among a group of companions sharing devices, for example when a parent wants to limit the devices that a child can control through the child's companion.

In another implementation, the companion provides an interface between the user's home network and a financial network or database. The companion can access a financial account of the user's and submit financial transactions according to other transactions requested by the user. For example, if the user has a copy of a content file stored on a laptop computer that has an associated charge for each time the content file is accessed, the companion can facilitate deducting the fee from the user's financial account when the user has requested access to the content file.

In one implementation, the companion provides high level support for the interface with the user and the agents provide the command building. The companion includes user preferences and information about the devices, but agents perform the processing and building of lists, responses, and commands. For example, when the companion is connected to a host device, the host agent builds a selection list using information retrieved from the companion and device data retrieved by the host agent. Similarly, the host agent builds commands and handles interacting with the user (e.g., formatting output data and building sub-selection lists). In another implementation, a remote agent receives a request or command and builds additional commands for local execution or to send to other remote agents to carry out the received request or command.

In one implementation, the companion provides an interface or gateway service to accessing content on a large network, such as the Internet. The companion provides searching and filtering to locate, sort, and present content and resources matching requests input by the user. The user can inspect and modify the operation of the companion (such as through selections in a sub-selection list), including, but not limited to: the network or web searched, the search parameters, the filter parameters, the sort parameters, access restrictions and passwords, individual and group rights associated with the companion or a user profile accessed by the companion, and download and streaming limits for bandwidth, total data, and time.

The various implementations of the invention are realized in electronic hardware, computer software, or combinations of these technologies. Most implementations include one or more computer programs executed by a programmable computer. For example, referring to FIG. 1, in one implementation, a host device includes one or more computers executing software implementing the companion and the host agent. Similarly, the remote devices include a computer to provide the remote agents and interact with the host agent and the companion. In another implementation, the portable memory device storing the companion is also a computer. In general, each computer includes one or more processors, one or more data-storage components (e.g., volatile or non-volatile memory modules and persistent optical and magnetic storage devices, such as hard and floppy disk drives, DVD and CD-ROM drives, and magnetic tape drives), one or more input devices (e.g., mice and keyboards), and one or more output devices (e.g., display consoles and printers).

The computer programs include executable code that is usually stored in a persistent storage medium and then copied into memory at run-time. The processor executes the code by retrieving program instructions from memory in a prescribed order. When executing the program code, the computer receives data from the input and/or storage devices, performs operations on the data, and then delivers the resulting data to the output and/or storage devices.

Various illustrative implementations of the present invention have been described. However, one of ordinary skill in the art will see that additional implementations are also possible and within the scope of the present invention. For example, while the above description describes several implementations of companions and agents, additional variations and combinations are possible. Accordingly, the present invention is not limited to only those implementations described above.

What is claimed is:

1. A ubiquitous companion configured to connect to a host device, the ubiquitous companion comprising:
   an agent interface configured to provide communication between the ubiquitous companion and an agent residing on the host device accessible to the ubiquitous companion, said agent interface configured to access host device data indicating one or more capabilities of the host device;
   a command interface configured to build one or more agent commands according to service functionality in the host device data and a request selection received from a user through the host device, said command interface building the one or more commands to control one or more remote devices remote to the host device,
   wherein said command interface builds different user interface for the host device than that of the one or more remote devices because functionalities of the host device are different from those of the one or more remote devices;
   an output interface for providing feedback to the user through the host device in a format that is adapted according to the host device data such that functions of the one or more remote devices are controllable from the host device using the format set up by the output interface;
   a controller for controlling interactions among the agent interface, the command interface, and the output interface,
   wherein the interactions among the interfaces in the ubiquitous companion are configured to provide format adaptability between the host device and the one or more remote devices with different interface functionalities; and
   wherein the ubiquitous companion is a portable unit that is portable from one device to another device.

2. The ubiquitous companion of claim 1, further comprising:
   storage for storing remote device data indicating one or more capabilities of each of the one or more remote devices, and for storing the host device data,
   wherein the remote device data includes input and output functionalities of the one or more remote devices, and
   wherein the host device data includes input, output, and service functionalities of the host device.

3. The ubiquitous companion of claim 1, wherein the feedback provided by the output interface to the user through the host device in a format that is adapted according to the host device data includes
   a visual display of the functions of the one or more remote devices.

4. The ubiquitous companion of claim 1, wherein the agent interface sends one or more agent commands to a remote agent residing on a remote device connected to the host device through a network.

5. The ubiquitous companion of claim 1, wherein the agent interface sends one or more agent commands to a first remote agent residing on a first remote device connected to the host device through a network, and sends one or more agent commands to a second remote agent residing on a second remote device connected to the host device through the network.

6. The ubiquitous companion of claim 1, wherein the ubiquitous companion coupled to the corresponding host device is configured to cooperate with a second ubiquitous companion coupled to a remote device so that the ubiquitous companions act together as an intermediary between the host device and the remote device.

7. The ubiquitous companion of claim 1, further comprising:
   a security component for conditionally limiting the operation of the companion.

8. The ubiquitous companion of claim 7, wherein the security component authenticates the user, and when authentication fails, the command interface does not build agent commands.

9. The ubiquitous companion of claim 7, wherein the security component provides content control.

10. The ubiquitous companion of claim 9, wherein the security component provides content control using a digital rights management system.

11. The ubiquitous companion of claim 1, further comprising:
   a computer readable medium encoded with a computer program, the computer program comprising executable instructions to execute the agent interface, the output interface, the command interface, and the controller.

12. The ubiquitous companion of claim 6, wherein the ubiquitous companions act together as an intermediary between the host device and the remote device to set up a network game between the users.

13. The ubiquitous companion of claim 6, wherein the ubiquitous companions include priority levels to resolve conflicts between differing instructions for a same device.

* * * * *